United States Patent [19]

Davis

[11] Patent Number: 5,920,624
[45] Date of Patent: Jul. 6, 1999

US005920624A

[54] TELEPHONE RING SIGNAL DETECTOR

[75] Inventor: William Folsom Davis, Tempe, Ariz.

[73] Assignee: Dasym Technologies INc., Mesa, Ariz.

[21] Appl. No.: 08/876,446

[22] Filed: Jun. 16, 1997

[51] Int. Cl.[6] ...................................................... H04M 1/00
[52] U.S. Cl. ........................... 379/373; 379/377; 379/382
[58] Field of Search .................................... 379/373, 375, 379/3, 180, 181, 182, 183, 184, 185, 377, 382

[56] References Cited

U.S. PATENT DOCUMENTS

| | | | |
|---|---|---|---|
| 4,066,848 | 1/1978 | Darwood | 379/351 |
| 4,446,334 | 5/1984 | Groff | 379/188 |
| 4,484,036 | 11/1984 | Lyle et al. | 379/351 |
| 4,939,775 | 7/1990 | Houck et al. | 379/373 |
| 5,048,076 | 9/1991 | Maurer . | |
| 5,062,133 | 10/1991 | Melrose . | |
| 5,146,489 | 9/1992 | Telibasa | 379/100.15 |
| 5,544,241 | 8/1996 | Dibner et al. | 379/373 |
| 5,675,640 | 10/1997 | Tappert et al. | 379/373 |

*Primary Examiner*—Nguyen Vo
*Assistant Examiner*—Charles N. Appiah

[57] ABSTRACT

A telephone ring signal detector for detecting a telephone ring signal voltage on a telecommunications line connectable to at least one line telephone device. Detector includes a ring signal processor comprising a voltage translating device for providing a translated electrical parameter and an electrical parameter threshold setting device for providing a predetermined threshold reference electrical parameter value. The setting device provides a ring signal detect output signal when an electrical parameter value of the translated parameter exceeds the predetermined threshold reference electrical parameter value in a first quarter cycle time period of a first telephone ring signal cycle time period. In response to the ring signal detect output signal, a line impedance switch couples a first telephone device off-hook terminal impedance to the line to provide a first answering function, couples a detector line signal to the line and provides a simulated telephone ring signal to a telephone device output port connectable to an output telephone device. The output telephone device terminal impedance is monitored by an output line monitor to activate or deactivate a port coupling line switch which uncouples or couples the output port to the line in response to a second answering function by the output telephone device. The detector also receives and processes a caller line signal to activate an audible alerting signal. When in response to the alerting signal a person activates the line telephone device, an input line monitor uncouples the first off-hook terminal impedance from the line in response to a second telephone device off-hook terminal impedance associated with the telephone line device.

23 Claims, 9 Drawing Sheets

TELEPHONE RING SIGNAL DETECTOR

BACKGROUND OF THE INVENTION

This invention relates to telecommunications and, more specifically, to a telephone ring signal detector, detecting a telephone ring signal voltage on a telecommunications line and providing a telephone answering function on the line, prior to a first quarter cycle time period of a first telephone ring signal cycle time period.

Many premises, such as a home or a small business office, are equipped with a single subscriber telecommunication line (or a telephone line), due to cost and other considerations. Such premises often employ multiple extension telephones, which are typically connected in parallel to the telephone line and are usually located throughout the premise.

During an incoming telephone call, each premise telephone, or line telephone, detects a telephone ring signal voltage on the telephone line. Each telephone can respond to the ring signal voltage, by activating an audible telephone ringer mechanism. This "ringing" of multiple telephones throughout the premise can disturb most premise personnel until the call is answered.

Several methods have been developed to eliminate this disturbance at the premise due to "ringing" telephones. One method physically disconnects the telephones from the line, which is similar to another method that allows the user to switch "off" the audible telephone ringer mechanism. Both methods are not practical for multiple extension telephones which are widely separated throughout the premise. In addition, these methods impose a severe limitation on a telephone's usefulness, especially for incoming emergency calls. Another method utilizes a telephone answering device (TAD) connected in series between the telephone line and each telephone. During the telephone ring signal voltage, the TADs provide a non-conductive "open" circuit to the attached telephones, thereby preventing the ring signal voltage from "ringing" these telephones. One example uses a master telephone answering device (MTAD), which is the only device connected to the line. The MTAD silently answers the telephone call and switches the line to the appropriate telephone based on a caller line signal, including a "touch tone" signal and a facsimile (or FAX) signal. External telephone wiring is required between the MTAD and all extension telephones. This can be impractical for widely separated telephones located in different rooms or on different floors. Another example also utilizes a line connected MTAD, but further employs an extension telephone answering device (ETAD) connected in series between each extension telephone and the line. The MTAD silently answers the call, since the ETADs provide a non-conductive "open" circuit to the attached extension telephones. When the caller selects one of the ETADs using one of the caller line signals, the selected extension telephone is connected to the line. This method is complex and not cost effective, since each extension telephone requires an attached ETAD, and each selected ETAD must provide additional complex functions for the extension telephones to function normally.

A telephone ring signal detector can also be used to prevent the "ringing" of line telephones, by detecting a first telephone ring signal voltage and connecting a telephone device off-hook terminal impedance to the line, during the first telephone ring signal cycle time period of the first telephone ring signal. The telephone device off-hook terminal impedance is a telephone device terminal impedance when a telephone device receiver is removed from a telephone device cradle and hook switch. (A telephone device on-hook terminal impedance is the telephone device terminal impedance when the telephone device receiver is placed on the telephone device cradle and hook switch.) A Telephone Company Central Office (CO) detects the off-hook terminal impedance on the line and terminates the first telephone ring signal voltage. This prevents the first ring signal voltage from achieving sufficient magnitude or energy to activate any of the audible telephone ringer mechanisms coupled to the line. A ring signal detector, described in U.S. Pat. No. 5,544,241 to Dibner, Aug. 6, 1996, generates a ring signal detect output signal and couples the off-hook terminal impedance to the line, after a predetermined time delay from an initial time when the telephone ring signal voltage exceeds a predetermined ring signal threshold voltage. The ring detect output signal occurs anytime during the first telephone ring signal cycle time period dependent on the time delay. If the time delay is implemented by a digital timing technique to measure a time interval, then a clock, a clock cycle counter, a timing reference and a timing comparator are required as describe by Dibner. If the time delay employs an analog timing technique to measure the time interval, an energy storage element, a charging and discharge circuit, a analog reference element and an analog comparator is required. Either timing technique to measure time intervals adds cost and complexity to Dibner's ring signal detector. Dibner's ring signal detector also monitors for an inactive line, by detecting a dial tone signal, which adds further cost and complexity to the detector.

SUMMARY OF THE INVENTION

Accordingly it is an object of the present invention to provide an improved telephone ring signal detector.

It is another object of the invention to provide an improved telephone ring signal detector which eliminates a need to disconnect any telephone from a telephone line or to turn "off" an audible telephone ringer mechanism to prevent premise telephones from "ringing", or responding to a first telephone ring signal voltage.

It is yet another object of the invention to provide an improved telephone ring signal detector which eliminates the cost, complexity, and need for a telephone answering device to be connected in series between all premise telephones and the line, to prevent premise telephones from "ringing", or responding to the telephone ring signal voltage.

A further object of the invention is to provide an improved telephone ring signal detector which provides a ring signal detect output signal prior to a first quarter cycle time period, during a first telephone ring signal cycle time period, and eliminates the need for the complexity and cost of a predetermined time delay from an initial time when the telephone ring signal voltage exceeds a predetermined ring signal threshold voltage and the time when the ring detect output signal occurs.

Another object of the invention is to provide an improved telephone ring signal detector which couples a first telephone device off-hook terminal impedance to the telephone line in response to the ring signal detect output signal, thereby preventing the first telephone ring signal voltage from activating any audible telephone ringer mechanisms associated with line telephone devices connected in parallel to the telephone line.

Still another object of the invention is to provide an improved telephone ring signal detector which, in response to the ring signal detect output signal, generates a simulated telephone ring signal coupled to a telephone device output port which is connectable to an output telephone device having an output telephone device terminal impedance.

Still further object of the invention is to provide an improved telephone ring signal detector which further couples the output port to the line when the output device terminal impedance is an output telephone device off-hook terminal impedance, and the detector uncouples the output port from the line when the output device terminal impedance is an output telephone device on-hook terminal impedance.

Yet another object of the invention is to provide an improved telephone ring signal detector which couples at least one detector line signal to the line, in response to the ring signal detect output signal, and processes and responds to a caller line signal on the line when the first off-hook terminal impedance is coupled to the line.

An additional object of the invention is to provide an improved telephone ring signal detector which uncouples the first off-hook terminal impedance from the line when the output device terminal impedance is the output off-hook terminal impedance or when at least one other line telephone device, which is connectable to the line, provides a second telephone device off-hook terminal impedance on the line.

Another object of the invention is to provide an improved telephone ring signal detector for which a need for the cost and complexity of monitoring for line inactivity is not required.

In accordance with the above and other objects, and according to a first aspect of the invention there is provided a telephone ring signal detector which comprises a telephone ring signal processor which is coupled to a telecommunications line through a line input port. The ring signal processor provides a ring signal detect output signal when a first telephone ring signal voltage exceeds a predetermined ring signal threshold voltage during a first quarter cycle time period of a first telephone ring signal cycle time period.

According to a second aspect of the invention, a telephone ring signal detector further comprises a line impedance switch which couples a first telephone device off-hook terminal impedance to the telecommunications line to provide a first telephone answering function in response to the ring detect output signal.

According to a third aspect of the invention, the telephone ring signal detector further comprises a telephone device output port, connectable to an output telephone device having an output telephone device terminal impedance. The output port is further coupled to a telephone ring signal generator, which provides a simulated telephone ring signal to the output port, in response to the ring signal detect output signal. When the output terminal impedance is an output telephone device off-hook terminal impedance, then an output line monitor detects the output off-hook terminal impedance at the output port as a second telephone answering function and provides a first output line monitor output signal which terminates the simulated ring signal voltage, uncouples the first off-hook terminal impedance from the line, and couples the output port to the line through a port coupling line switch. When the output terminal impedance is an output telephone device on-hook terminal impedance, then the output line monitor detects the output on-hook terminal impedance at the output port and provides a second output line monitor output signal which deactivates the port coupling line switch which uncouples the output port from the line.

According to a fourth aspect of the invention, the telephone ring signal detector also comprises the line input port coupled to the telecommunications line capable of having a caller line signal, and connectable to a line telephone device. The detector further comprises a line signal generator, a line signal decoder, an audible alerting device, and an input line monitor which are all coupled to the line when the first off-hook terminal impedance is coupled to the line. The line signal generator couples at least one detector line signal to the line in response to the ring signal detect output signal, and a line signal decoder detects a caller line signal frequency associated with the caller line signal after the first off-hook terminal impedance is coupled to the line. When the caller line signal frequency is at least one predetermined caller line signal frequency, a line signal decoder output signal activates the audible alerting device to provide an audible signal. When in response to the audible signal a person activates the line telephone device, such as a telephone to communicate with the caller, a second telephone device off-hook terminal impedance associated with the line telephone device is coupled to the line. The input line monitor detects the first and second off-hook terminal impedances being both coupled to the line and provides an input line monitor output signal to deactivate the line impedance switch which uncouples the first off-hook terminal impedance from the line.

BRIEF DESCRIPTION OF THE DRAWINGS

The above and other objects, features and advantages of the present invention will be more clearly understood from the following detailed description taken in conjunction with the accompanying drawings in which.

DETAILED DESCRIPTION OF THE DRAWINGS

Figure 1:
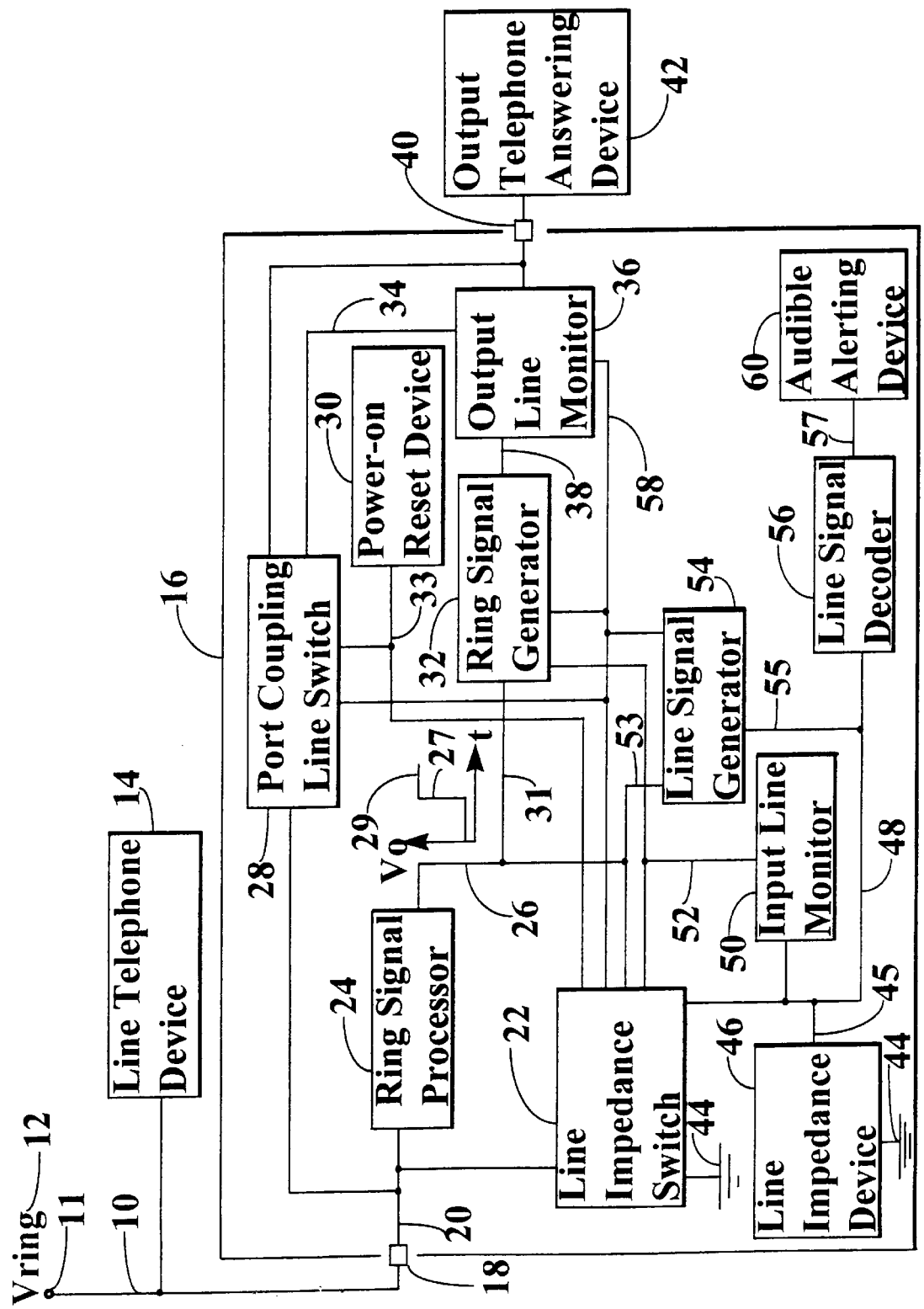
FIG. 1 shows a block diagram of one embodiment of a telephone ring signal detector coupled to a telecommunications line, a line telephone device, and an output telephone answering device.

FIG. 1 demonstrates a block diagram of a preferred embodiment of a telephone ring signal detector 16 which comprises a line input port 18 and a telephone device output port 40. Input port 18 is coupled to a telecommunications line 10, such as a single subscriber telephone line provided by a Telephone Company Central Office (CO). A telephone ring signal voltage 12, or Vring, is provided by the CO at a subscriber line input 11 coupled to line 10. Line 10 is also connectable to at least one line telephone device 14, such as a standard telephone. Port 40 is connectable to an output telephone answering device 42, such as a PhoneMate 4300 telephone answering machine. Input port 18 is further coupled to a telephone input line 20 which is coupled to a telephone ring signal processor 24, a line impedance switch 22, and a port coupling line switch 28. Processor 24 is coupled to a ring signal detect output line 26 which is coupled to a telephone ring signal generator 32 by a telephone ring signal generator input line 31. Line 26 is further coupled to switch 22 and to a line signal generator 54 by a line signal generator input line 53. Switch 22 is also coupled to a reference ground terminal 44 and a coupling line 48. Line 48 is further coupled to generator 54 by a line signal generator output line 55, and to a line impedance device 46 by a line impedance device output line 45. Device 46 is also coupled to terminal 44. Line 48 is further coupled to a line signal decoder 56 and an input line monitor 50. Decoder 56 is further coupled to an audible alerting device 60 by a line signal decoder output line 57. Monitor 50 is coupled to an input line monitor output line 52 which is coupled to switch 22 and generator 32. An output line monitor 36 is coupled to generator 32 by a telephone ring signal generator output line 38, and to port 40. Monitor 36 is also coupled to an output off-hook detect output line 58 which is coupled to generator 32, switch 22, generator 54, and switch 28. Monitor 36 is further coupled to an output on-hook detect output line 34 which is coupled to switch 28. Switch 28 is also coupled to port 40. A power-on reset device 30 is coupled to a power-on reset line 33 which is coupled to switches 22 and 28.

Prior to the application of a telephone ring signal on line 10, and after a primary power supply has been switched "ON" to supply power to device 16, device 30 provides a power-on reset signal on a reset line 33 which is coupled to switches 22 and 28, disabling both switches to a non-conducting "open" position. When voltage Vring is applied to line 10, processor 24 provides a ring signal detect output signal 27 as shown by a positive going voltage transition of a ring signal detect output signal waveform 29 on line 26 prior to a first quarter cycle time period of a first telephone ring signal cycle time period (Tp) of Vring. Ring detect signal 27 is applied to generator 32 which responds by generating a simulated telephone ring signal on line 38. Ring detect signal 27 is also applied to switch 22 which responds by activating switch 22 to a conducting "closed" position, which couples line 10 to line 48. Thus monitor 50, generator 54, decoder 56, and device 46 are all coupled to line 10 in response to ring detect signal 27. Since a terminal impedance of device 46 on line 45 is a first telephone device off-hook terminal impedance, this first off-hook terminal impedance is coupled to line 10 as a first telephone answering function prior to the first quarter cycle time period of the first ring cycle time period Tp. The first off-hook terminal impedance on line 10 is sensed by the Central Office which terminates voltage Vring in response to the first off-hook terminal impedance. Thus voltage Vring is unable to gain sufficient amplitude or energy to activate and "ring" a telephone ringer mechanism associated with device 14, and is unable to "ring" any other telephone devices coupled to line 10.

Ring detect signal 27 also activates generator 54 to couple a detector line signal to line 48 which is coupled to line 10 through switch 22. The detector line signal is an electrical signal, having at least one detector line signal frequency such as an audio frequency signal of at least one predetermined audio frequency. A voice signal is another example of the detector line signal. A predetermined cadence of the audio frequency signal provides a periodic audio frequency signal to simulate an audio "ringback" signal normally heard by a caller to indicate the "ringing" of a remote line telephone device. In a broadest application, the line detector signal from generator 54 allows the caller to first hear a predetermined audio voice message after line 48 is coupled to line 10, and then hear the "ringback" signal to indicate that the simulated ring signal is continuing to be applied to line 38 by generator 32. The caller can also initiate a caller line signal having at least one caller line signal frequency such as a Dual Tone Mullet-Frequency (DTMF) signal, or a "touch-tone" signal, which is coupled from line 10 to line 48 through switch 22. When the caller line signal frequency is at least one predetermined caller line signal frequency, decoder 56 provides a line signal decoder output signal on line 57 to activate device 60, which provides an audible alerting signal anytime during the detector line signals from generator 54. The audible signal encourages a person to activate device 14 to communicate with the caller. Upon activation, device 14 couples a second telephone device off-hook terminal impedance to the first off-hook terminal impedance of device 46, since both being coupled to line 10. Monitor 50 provides an input line monitor output signal on line 52 after detecting at least the first and the second off-hook terminal impedance of respective devices 46 and 14 coupled to line 10. The input monitor output signal deactivates switch 22 to the non-conducting "open" position which uncouples line 48, monitor 50, generator 54, decoder 56, and device 46 from line 10. Thus with both switches 22 and 28 in the non-conductive positions, device 16 is uncoupled from line 10, and only the second off-hook terminal impedance of device 14 remains coupled to line 10 when device 14 is used to communicate with the caller. If the caller fails to activate device 60, and device 14 continues to exhibit a second telephone device on-hook terminal impedance on line 10, then the input monitor output signal remains inactive and generator 32 continues to provide the simulated ring signal on line 38.

Monitor 36 couples the simulated ring signal on line 38 to port 40 and monitors a ring signal output current being coupled to port 40. An output port impedance at port 40 is established by an output telephone device terminal impedance of device 42 which is connectable to port 40. When the output port impedance becomes an output telephone device off-hook terminal impedance provided by device 42, then a second telephone answering function is provided and monitor 36 senses an increase in the ring signal output current and provides a first output line monitor output signal on line 58. Answering device 42 can typically be programmed by a user to answer, or provide the output off-hook terminal impedance, after a predetermined number of groups of simulated ring signals, commonly referred to as ring signal bursts, from generator 32. The first output line monitor output signal terminates the simulated ring signal, deactivates switch 22 to the non-conducting "open" position such that line 48 and at least device 46 is uncoupled from line 10, activates switch 28 to a conducting "closed" position which couples line 10 through port 18 to port 40, and terminates the detector line signal from generator 54. Thus when device 46 is uncoupled 10 when device 46 is uncoupled from the line. Answering device 42 then operates normally such as providing an outgoing message, a recorded message, and providing other typical functions including the detection of a completed recording, an inactive telephone line, and a caller "hang-up". In addition, device 42 determines an output device uncoupling time to provide an output telephone device on-hook terminal impedance to port 40 at the uncoupling time. The uncoupling time of device 42 is completely determined and controlled by an uncoupling function of device 42, and thus this uncoupling function is not required of device 16. Monitor 36 senses the output on-hook terminal impedance at port 40 of device 42 and provides a second output line monitor output signal on line 34. The second output line monitor output signal deactivates switch 28 to the non-conducting "open" position which uncouples port 40 and device 42 from line 10. It is appreciated by one skilled in the art that output lines 34 and 58 could be one output line monitor output line with an output line monitor output signal having a high voltage logic output signal to signify the first output line monitor output signal, and a low voltage logic output signal to signify the second output line monitor output signal. After device 46 and port 40 are uncoupled from line 10, device 16 then awaits another telephone ring signal on line 10 to repeat a telephone ring signal response cycle just described.

Each block associated with detector 16 is next discussed in detail.

Figure 2:
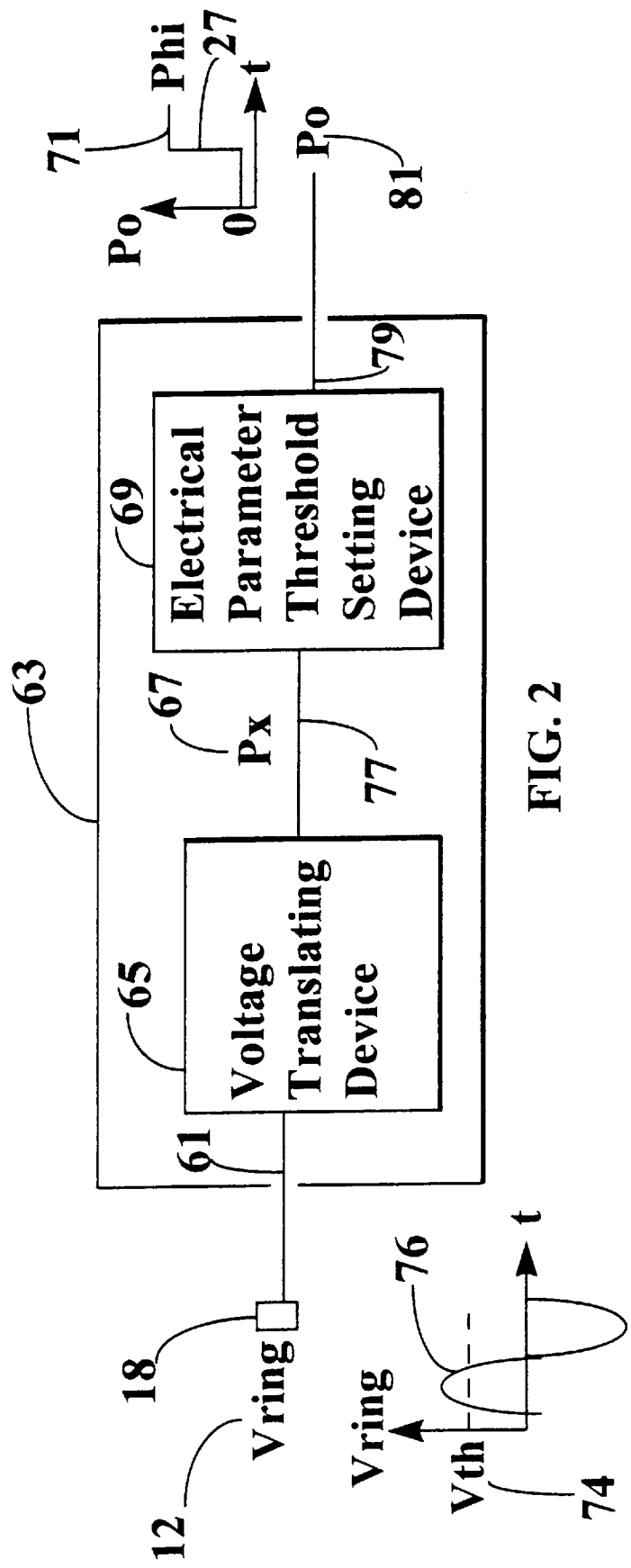
FIG. 2 demonstrates a general block diagram with input and output waveforms for a general embodiment of a telephone ring signal processor shown in FIG. 1, using general electrical parameters.

FIG. 2 shows a block diagram of a telephone ring signal processor 63 using general devices to implement processor 24 of FIG. 1. Processor 63 comprises an electrical parameter threshold setting device 69, and a voltage translating device 65. Device 65 is coupled to telecommunications line 10 by a voltage translating device input line 61 to receive voltage Vring at port 18. Device 65 is further coupled to a voltage translating device output line 77 which is coupled to an electrical parameter threshold setting device input of device 69. Device 69 is also coupled to an electrical parameter threshold setting device output line 79 to provide a ring signal detect output signal waveform 71 associated with a ring signal detect output signal parameter 81, or Po. A low (0) to higher (Phi) transition of parameter 81 on waveform 71 signifies a ring signal detect time when ring detect signal 27 occurs.

Functionally voltage Vring is translated by device 65 to a translated electrical parameter 67, or Px, which is provided on line 77. When an electrical parameter value of parameter 67 exceeds a predetermined threshold reference electrical parameter value, which is determined by device 69, device 69 provides ring detect signal 27. When the value of parameter 67 is equal to the predetermined threshold reference electrical parameter value, a value of voltage Vring is a predetermined ring signal threshold voltage 74, or Vth. Thus when voltage Vring exceeds voltage Vth as shown by a first ring signal voltage waveworm 76 of voltage Vring, the value of parameter 67 exceeds the predetermined threshold reference electrical parameter value to produce ring detect signal 27 shown by waveform 71.

Figure 3:
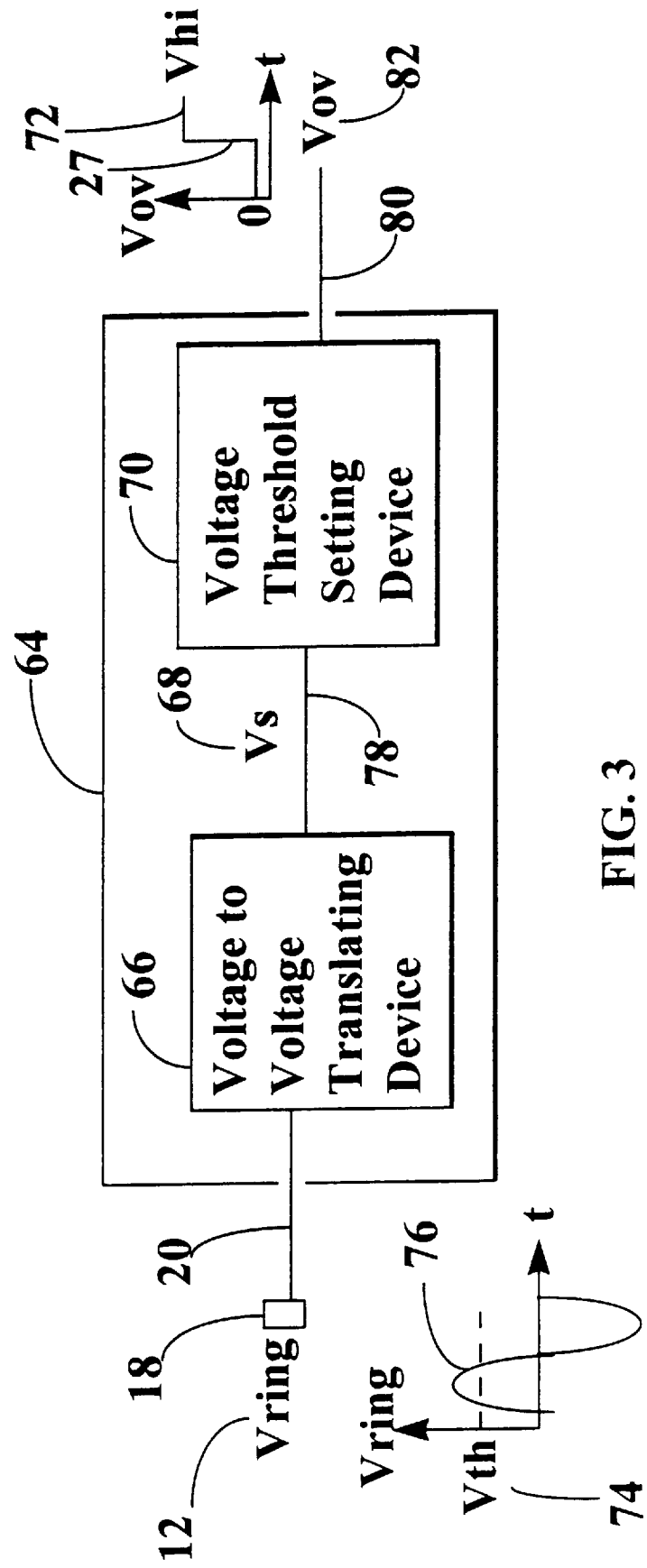
FIG. 3 demonstrates a block diagram with input and output voltage waveforms for a first embodiment of a telephone ring signal processor shown in FIG. 1, using voltage control methods.

FIG. 3 shows a block diagram of a first embodiment of a telephone ring signal processor 64 which employs voltage control methods to implement processor 24 of FIG. 1. Processor 64 comprises a voltage threshold setting device 70, and a voltage translating device in form of a voltage-to-voltage translating device 66. Device 66 is coupled to telecommunications line 10 using line 20 to receive voltage Vring at port 18. Device 66 is further coupled to a voltage-to-voltage translating device output line 78 which is coupled to an input of device 70. Device 70 is also coupled to a ring signal detect output line 80 to provide a telephone ring signal detect output signal waveform 72 associated with a ring signal detect output signal voltage 82, or Vov. A low (0) to higher (Vhi) voltage transition of voltage 82 on waveform 72 signifies the ring signal detect time when ring detect signal 27 occurs.

Functionally, voltage Vring is translated by device 66 to a different voltage magnitude or a different direct current (DC) voltage level or both and is provided on line 78 as a translated telephone ring signal voltage 68, or Vs. Thus device 66 can be thought of as a voltage translating device, translating voltage Vring to voltage Vs. When voltage Vs exceeds a predetermined threshold reference voltage Vthr, which is determined by device 70, then device 70 provides ring detect signal 27. When voltage Vs is equal to voltage Vthr, the value of voltage Vring is the predetermined ring signal threshold voltage Vth. Thus when voltage Vring exceeds voltage Vth as shown by the first ring signal voltage waveworm 76, voltage Vs exceeds voltage Vthr to produce ring detect signal 27 shown by waveform 72. The term voltage is understood to imply a voltage value, or a voltage.

Figure 4:
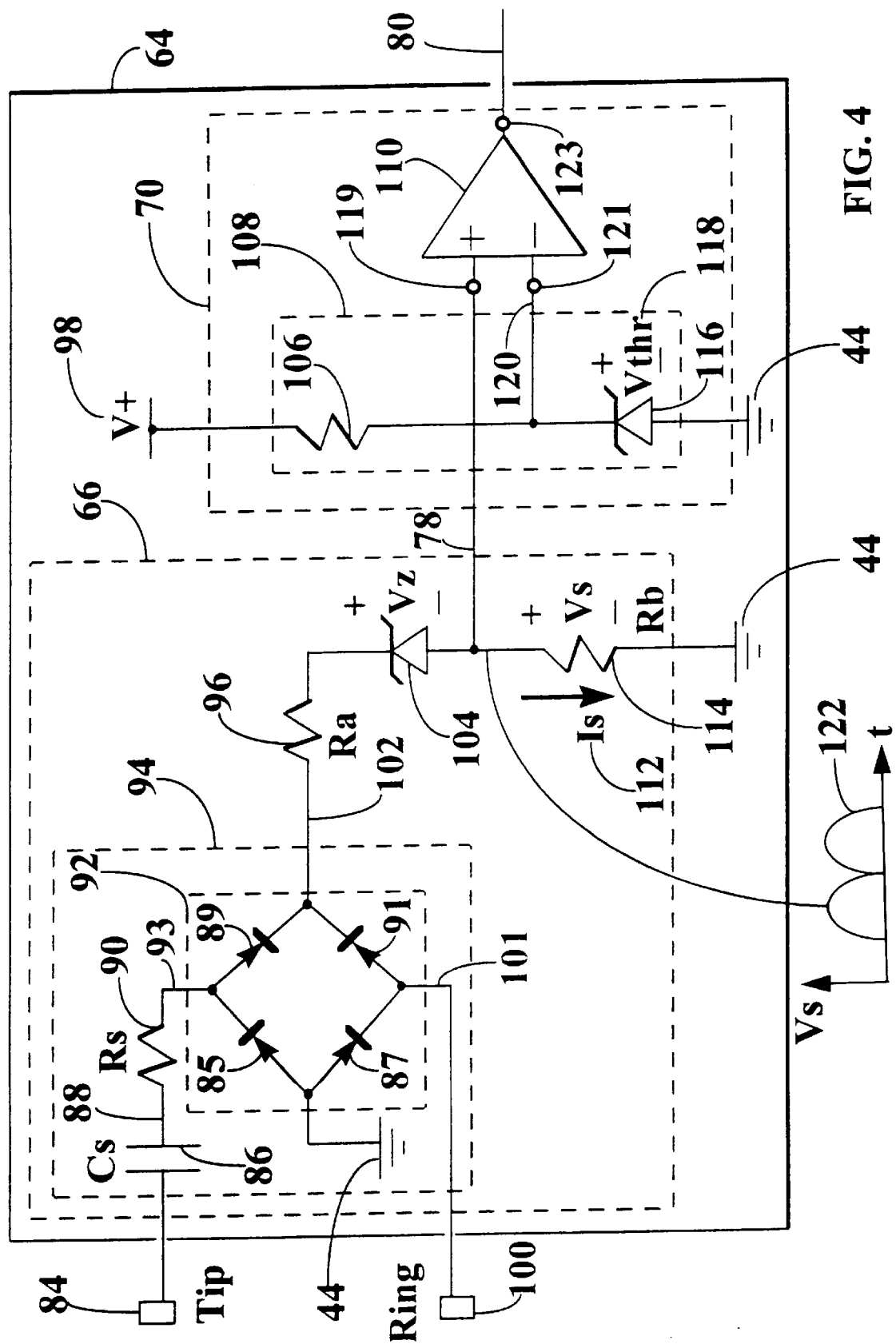
FIG. 4 is a detailed circuit schematic diagram of the telephone ring signal processor to implement the blocks and function associated with FIG. 3.

FIG. 4 illustrates a schematic diagram of a practical implementation of FIG. 3. A Tip telephone input terminal 84 and a Ring telephone input terminal 100 are adapted to receive voltage Vring. Translating device 66 consists of a ring signal coupler 94, a first resistor 96, a first Zener diode 104 and a second resistor 114. Terminals 84 and 100 are coupled to coupler 94 which consists of a DC blocking capacitor 86, a third resistor 90, and a polarity guard 92. Capacitor Cs is coupled to terminal 84 and connected to resistor 90 by a connecting line 88. Resistor 90 is also coupled to guard 92 by a first polarity guard input line 93. Guard 92 is also coupled to a ring signal coupler output line 102, and a reference ground terminal 44. A second polarity guard input line 101 is coupled to guard 92 and terminal 100. An anode of guard diode 85 is coupled to an anode of guard diode 87 and both anodes are coupled to terminal 44. A cathode of guard diode 89 is coupled to a cathode of guard diode 91 and both cathodes are coupled to line 102. Guard input line 93 is coupled to a cathode of guard diode 85 and an anode of guard diode 89. Guard input line 101 is coupled to a cathode of guard diode 87 and an anode of guard diode 91. Resistor 96 is coupled between line 102 and a cathode of diode 104. An anode of diode 104 is coupled to line 78 and resistor 114 which is coupled to terminal 44. Device 70 consists of a threshold reference voltage device 108 and a voltage comparator 110. Device 108 is coupled to a ring signal detector supply voltage 98, or V+, and terminal 44. Device 108 is further coupled to a threshold reference voltage device output line 120. Device 108 includes a biasing resistor 106 coupled between voltage 98 and line 120 which is also coupled to a cathode of a second Zener diode 116. An anode of diode 116 is coupled to terminal 44. Line 120 is coupled to a first voltage comparator input 121 and line 78 is coupled to a second voltage comparator input 119. Line 80 is also coupled to a voltage comparator output 123.

Functionally, voltage Vring is applied across terminals 84 and 100 which is also applied to coupler 94. For a given ring signal frequency, a magnitude of a capacitance impedance of capacitor Cs is chosen to be much less than a resistive sum of resistors 90, 96 and 114, to insure a negligible ring signal voltage drop across capacitor Cs. Thus voltage Vring essentially appears between line 88 and terminal 100. Guard 92 produces a full wave rectification at line 102 relative to terminal 44 of an alternating input signal voltage between polarity guard input lines 93 and 101. Each diode of guard 92 produces a guard diode forward biased voltage drop Vdpg. Thus a polarity guard output voltage on line 102 relative to terminal 44 is less than a polarity guard input voltage between lines 93 and 101 by a two guard diode forward voltage drop 2 Vdpg. When a positive signal voltage on line 102 exceeds a first Zener voltage, Vz, of diode 104, then a series signal current 112, or Is, would flow through diode 104 and resistors 96 and 114. When a magnitude of voltage Vring between terminals 84 and 100 exceeds a device voltage drop (Vz+2Vdpg), then current 112 flows through guard 92 including resistor 90, diode 104, and resistors 96 and 114 during either polarity of voltage Vring. Thus for a absolute magnitude of voltage Vring (|Vring|) greater than voltage drop (Vz+2Vdpg), current Is is written as;

$$Is=[|Vring|-(Vz+2Vdpg)]/(Rs+Ra+Rb).$$

The translated voltage Vs appears across resistor 114 with a magnitude of voltage Vs defined by a (Is)(Rb) voltage drop. Thus;

$$Vs=(Is)(Rb)=[|Vring|-(Vz+2Vdpg)]/(Rs+Ra+Rb)]Rb.$$

For ring signal waveform 76, and during the ring cycle time period Tp, translated voltage Vs will appear as a full wave rectified scaled voltage waveform 122 across resistor 114. Thus relative to voltage Vring, voltage Vs is full wave rectified, scaled to a reduced voltage value, and level shifted to a different DC value. The magnitude of Vs is a function of a Rb/(Rs+Ra+Rb) resistive ratio, voltage drop (Vz+2Vdpg) and the absolute magnitude of Vring. Device 108 employs resistor 106 to supply a bias current from voltage 98 to diode 116 to produce the predetermined threshold reference voltage 118, or Vthr, on line 120. Comparator 110 compares voltage Vthr on a negative comparator input, with voltage Vs on a positive comparator input. Thus when voltage Vring exceeds voltage Vth, voltage Vs exceeds voltage Vthr, and comparator 110 provides ring detect signal 27 on line 80. Voltage Vth can be calculated by summing voltage drops from terminals 84 and 100 to terminal 44 when Vs=Vthr. Thus, $$Vth=Vthr+Vz+Is(Ra+Rs)+2Vdpg.$$

Circuit components associated with processor 64 are well known. Guard diodes 85, 87, 89, and 91 are industry standard 1N4004 devices. Zener diode 104 is a Motorola 1N4703 which produces voltage Vz of 16 volts. Zener diode 116 is a Motorola 1N4689 which produce voltage Vthr of 5.1 volts. Comparator 110 is an industry standard voltage comparator such as a LM339 Integrated Circuit (IC) which requires a pull-up resistor from line 80 to voltage 98 per Motorola LM339 data sheet. It is appreciated by one with ordinary skills in the art that the generation of voltages Vz and can be provided by many different voltage generating methods. For example, voltage regulator or voltage reference circuit methods can provide voltages Vz and Vthr, allowing for easy adjustment of either voltage.

Figure 5:
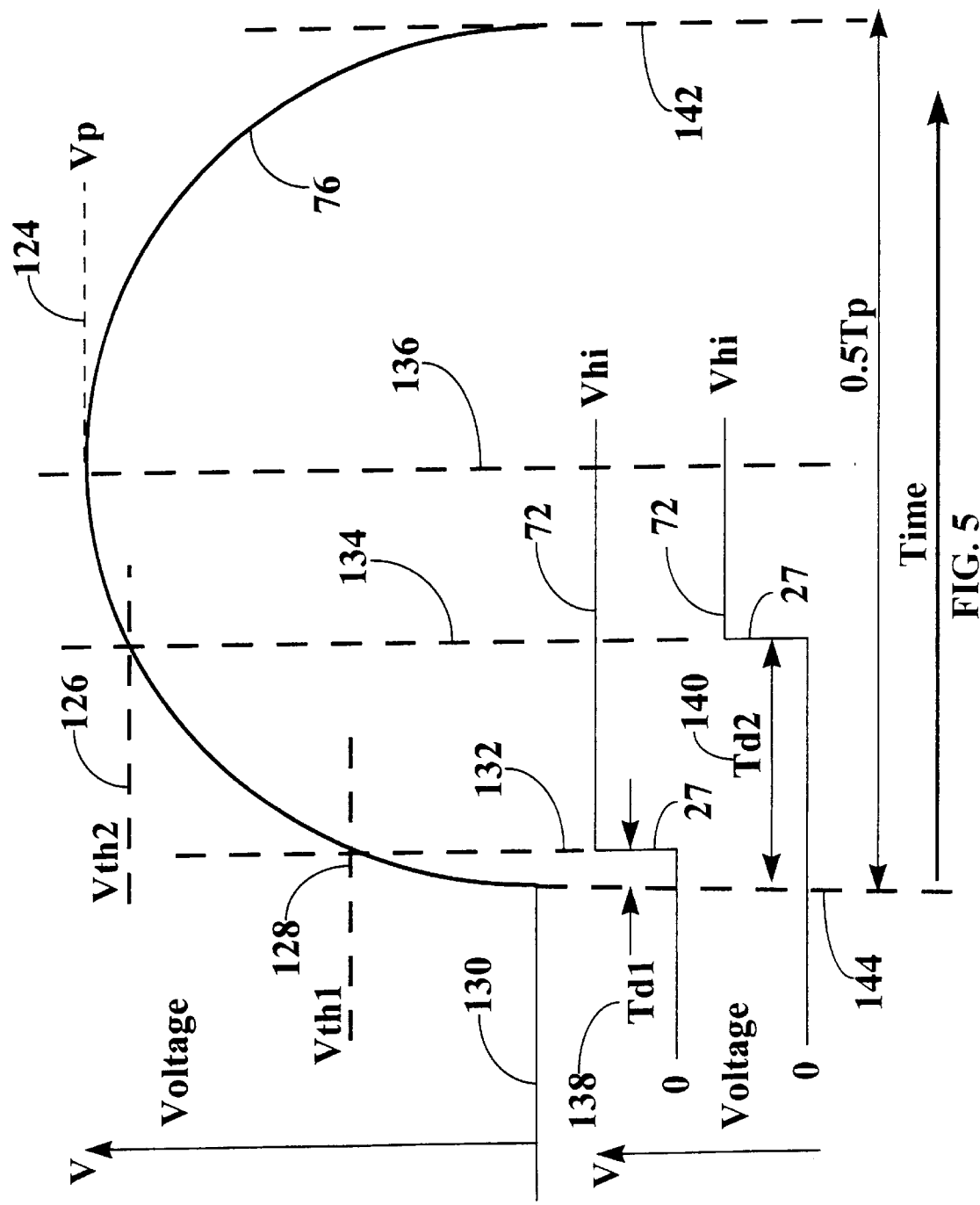
FIG. 5 illustrates a first telephone ring signal voltage waveform with associated threshold reference voltages and timing waveforms relating to FIG. 3 and FIG. 4 for a first half cycle time period of a first telephone ring signal cycle time period.

For the ring cycle time period Tp, FIG. 5 shows waveform 76 of voltage Vring for a first half cycle time period 142, or 0.5 Tp, in addition to ring detect signal waveform 72 with voltage and timing parameters associated with processor 64 of FIG. 3 and FIG. 4. During the first quarter cycle time period 136, voltage Vring initially increases from a pre-ring signal quiescent voltage 130 at a ring signal start time 144 to exceed a first predetermined ring signal threshold voltage 128, or Vth1, at a first threshold voltage crossing time 132. Since a corresponding first translated ring signal voltage Vs1 also exceeds a first predetermined threshold reference voltage Vthr1, ring detect signal 27 occurs on waveform 72 at time 132. Ring detect signal 27 is delayed from time 144 by a first ring signal detect delay time 138, or Td1. Delay time 138 can be increased, by increasing the ring signal threshold voltage from voltage Vth1 to a second predetermined ring signal threshold voltage 126, or Vth2. For this case, voltage Vring initially increases from voltage 130 at time 144 to exceed voltage Vth2 at a second threshold voltage crossing time 134. Since a corresponding second translated ring signal voltage Vs2 also exceeds a second predetermined threshold reference voltage Vthr2, ring detect signal 27 occurs on waveform 72 at time 134. Ring detect signal 27 is delayed from time 144 by a second ring signal detect delay time 140, or Td2. Thus the ring signal detect delay time associated with ring detect signal 27 can be predetermined from time 144 to time period 136 by threshold voltage Vth, which corresponds to a threshold reference voltage Vthr. If voltage Vth is greater than a peak telephone ring signal voltage 124, or Vp, the first threshold voltage crossing would never occur. Therefore, voltage Vth must always be less than voltage Vp for detecting the ring signal. Since delay times 138 and 140 can be predetermined without the need for a timing circuit to measure a predetermined time interval, timing devices to measure time intervals are not required to provide the ring signal detect delay time. Such timing devices would include digital clocks, counters, timing comparators, and timing references, or analog energy storage devices with analog energy charge and discharge circuits.

Figure 6:
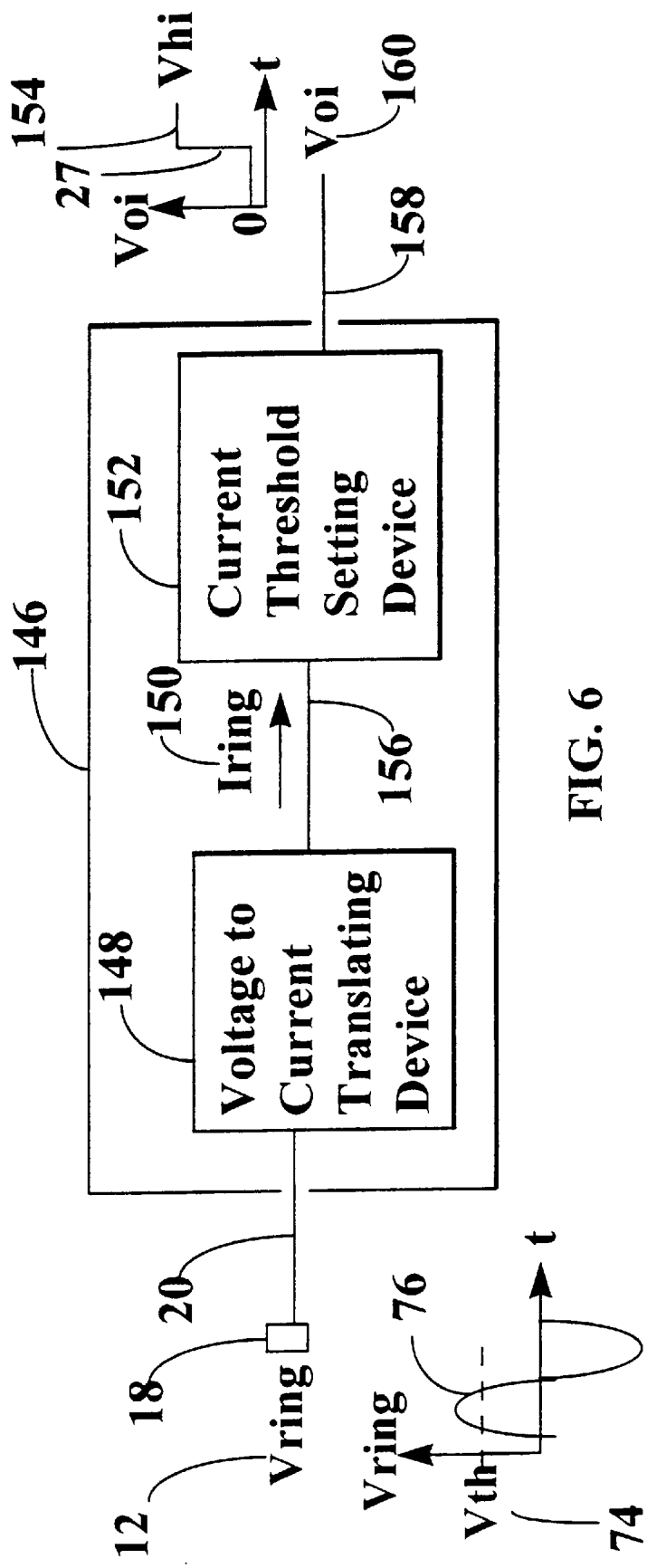
FIG. 6 demonstrates a block diagram with input and output voltage waveforms for a second embodiment of the telephone ring signal processor shown in FIG. 1, using current control methods.

FIG. 6 shows a block diagram of a second embodiment of a telephone ring signal processor 146 which employs current control methods to implement processor 24 of FIG. 1. Processor 146 comprises a current threshold setting device 152, and the voltage translating device in the form of a voltage-to-current translating device 148. Device 148 is coupled to telecommunications line 10 using line 20 to receive voltage Vring at port 18. Device 148 is further coupled to a voltage-to-current translating device output line 156 which is coupled to an input of device 152. Device 152 is also coupled to a ring signal detect output line 158 to produce a telephone ring signal detect output signal waveform 154 associated with a ring signal detect output signal voltage 160, or Voi. A low (0) to higher (Vhi) voltage transition of voltage 160 on waveform 154 signifies the ring signal detect time when ring detect signal 27 occurs.

Functionally, voltage Vring is translated by device 148 to a translated telephone ring signal current 150, or Iring, which is provided on line 156. When current Iring exceeds a predetermined threshold reference current Ithr, which is determined by device 152, then device 152 will provide ring detect signal 27. When current Iring is equal to current Ithr, the value of voltage Vring is the predetermined ring signal threshold voltage Vth. Thus when voltage Vring exceeds voltage Vth, current Iring exceeds current Ithr, and ring detect signal 27 occurs.

Figure 7:
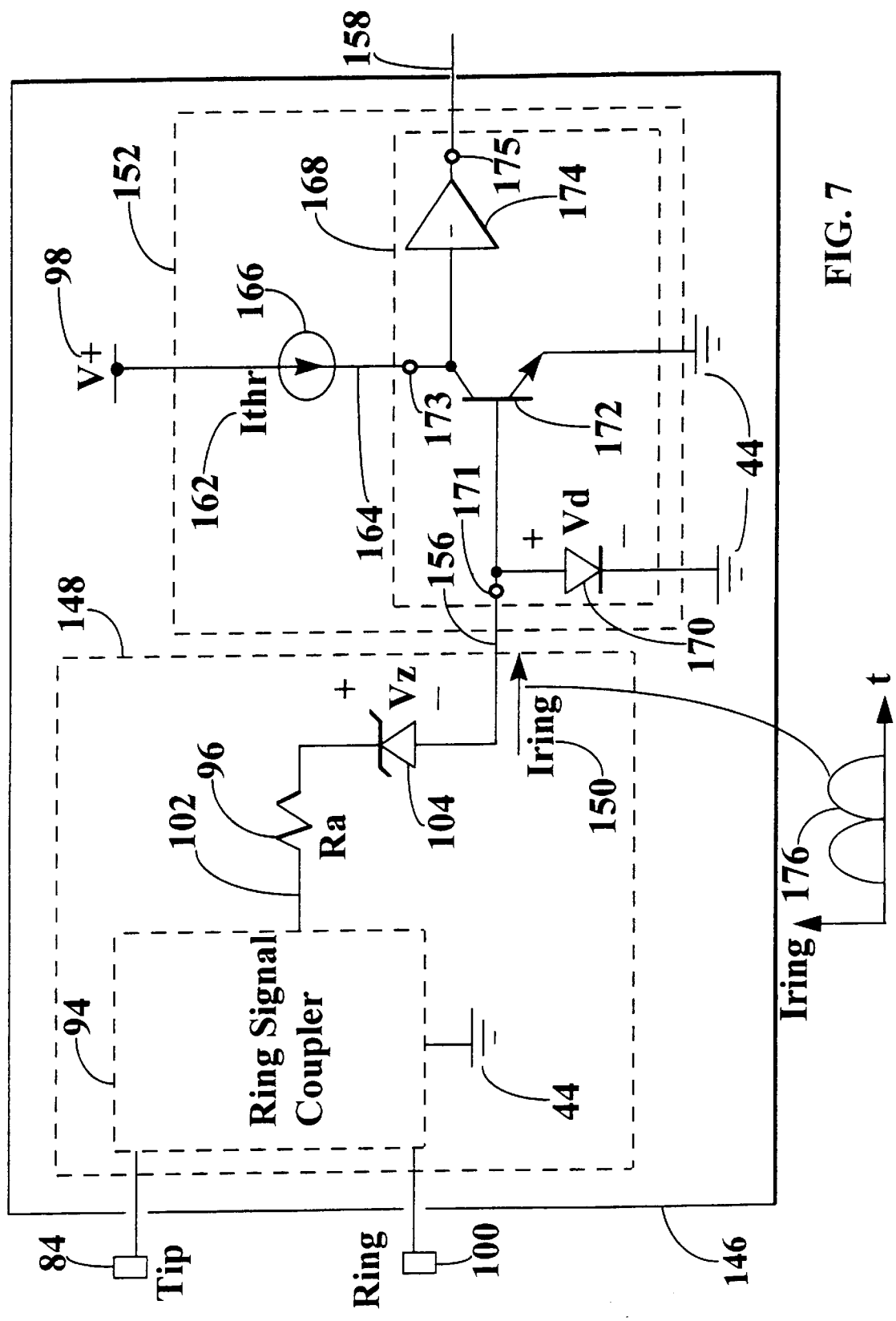
FIG. 7 is a detailed circuit schematic diagram of the telephone ring signal processor to implement the blocks and function associated with FIG. 6.

FIG. 7 demonstrates a schematic diagram of a practical implementation of FIG. 6. Tip and Ring terminals 84 and 100 respectively are adapted to receive voltage Vring. Translating device 148 consists of coupler 94, resistor 96, and diode 104. Coupler 94 is identical in all aspects to coupler 94 shown in FIG. 4. Terminals 84 and 100 are coupled to coupler 94 which is coupled to coupler line 102 and terminal 44. Resistor 96 is coupled between line 102 and the cathode of diode 104. The anode of diode 104 is coupled to line 156. Device 152 consists of a threshold reference current source 166 and a current comparator 168. Source 166 is coupled to voltage 98, and source 166 is further coupled to comparator 168 by a threshold reference current source output line 164. Comparator 168 includes an input comparator diode 170, a transistor 172, and a voltage inverter 174. Line 164 is coupled to a first current comparator input 173 which is coupled to a collector of transistor 172 and to an input of inverter 174. Line 156 is coupled to a second current comparator input 171 which is coupled to an anode of diode 170 and to a base of transistor 172. Inverter 174 is coupled to a current comparator output 175 which is coupled to line 158. A cathode of diode 170 and an emitter of transistor 172 are both coupled to terminal 44.

Functionally, voltage Vring is applied between terminals 84 and 100 and further coupled to coupler 94. When a positive signal voltage on line 102 exceeds a voltage sum of voltage Vz of diode 104, and a forward biased comparator diode voltage Vd of diode 170, then a signal current flows through diodes 104 and 170 and resistor 96. When the absolute magnitude of voltage Vring between terminals 84 and 100 exceeds voltage (Vz+2Vdpg+Vd), then current Iring would flow through coupler 94 including resistor 90 of FIG. 4, resistor 96, diode 104, and diode 170 during either polarity of voltage Vring. For this case, a magnitude of current Iring is written as;

$$Iring=[|Vring|-(Vz+2Vdpg+Vd3)]/(Rs+Ra),$$

which flows through diode 170. Thus for time period Tp and for ring signal waveform 76, device 148 translates voltage Vring to current Iring which is a full wave rectified scaled current as shown by a first full wave rectified scaled current waveform 176. The magnitude of current Iring is a function of the resistance (Ra+Rb), voltage (Vz+2Vdpg+Vd3) and the absolute magnitude of Vring.

The combination of diode 170 and transistor 172 form a "current mirror" circuit such that current Iring is reflected in the collector of transistor 172. The "current mirror" circuit forms the differential current input of comparator 168 with inputs 171 and 173. Thus when current Iring into input 171 is less than the predetermined threshold reference current 162, or Ithr, into input 173, the collector voltage of transistor 172 is forced to a high collector voltage state, causing inverter 174 to provide a low voltage logic state on output 175 and on line 158. When current Iring into input 171 is greater than current Ithr into input 173, the collector voltage of transistor 172 is forced to a low collector voltage state, causing inverter 174 to provide a high voltage logic state on output 175 and on line 158. When current Iring into input 171 exceeds current Ithr into input 173, the collector voltage of transistor 172 exhibits a high to low voltage transition, causing inverter 174 to provide a corresponding low to high voltage transition on output 175 and line 158, indicating ring detect signal 27. When Iring=Ithr, ring signal threshold voltage Vth can be defined as;

$$Vth=Vd+Vz+Ithr(Ra+Rs)+2Vdpg,$$

where Vdpg and Rs are terms associated with coupler 94 as previously discussed with FIG. 4.

Circuit components associated with processor 146 are well known. The circuit elements in coupler 94 are identical to elements in the previous coupler 94 discussed in FIG. 4. Zener diode 104 could be a Motorola 1N4703 to produce voltage Vz of 16 volts. It is appreciated by one with ordinary skills in the art that voltage Vz can be provided by many different methods, including the use of voltage regulator and reference circuit methods as previously discussed. The "current mirror" associated with diode 170 and transistor 172 is well known (Gray, Paul R. and Meyer, Robert G., *Analysis and Design of Analog Integrated Circuits*, Wiley, N.Y., 1993, pp. 270–271). The selection of diode 170 and transistor 172 should be based on matching the saturation current characteristics between these devices. Inverter 174 could be one of six inverters in a Motorola MC14069B Hex Inverter IC. Generating current Ithr associated with current source 166 is also well known with an example described by Gray and Meyer, pp. 277–278.

Figure 8:
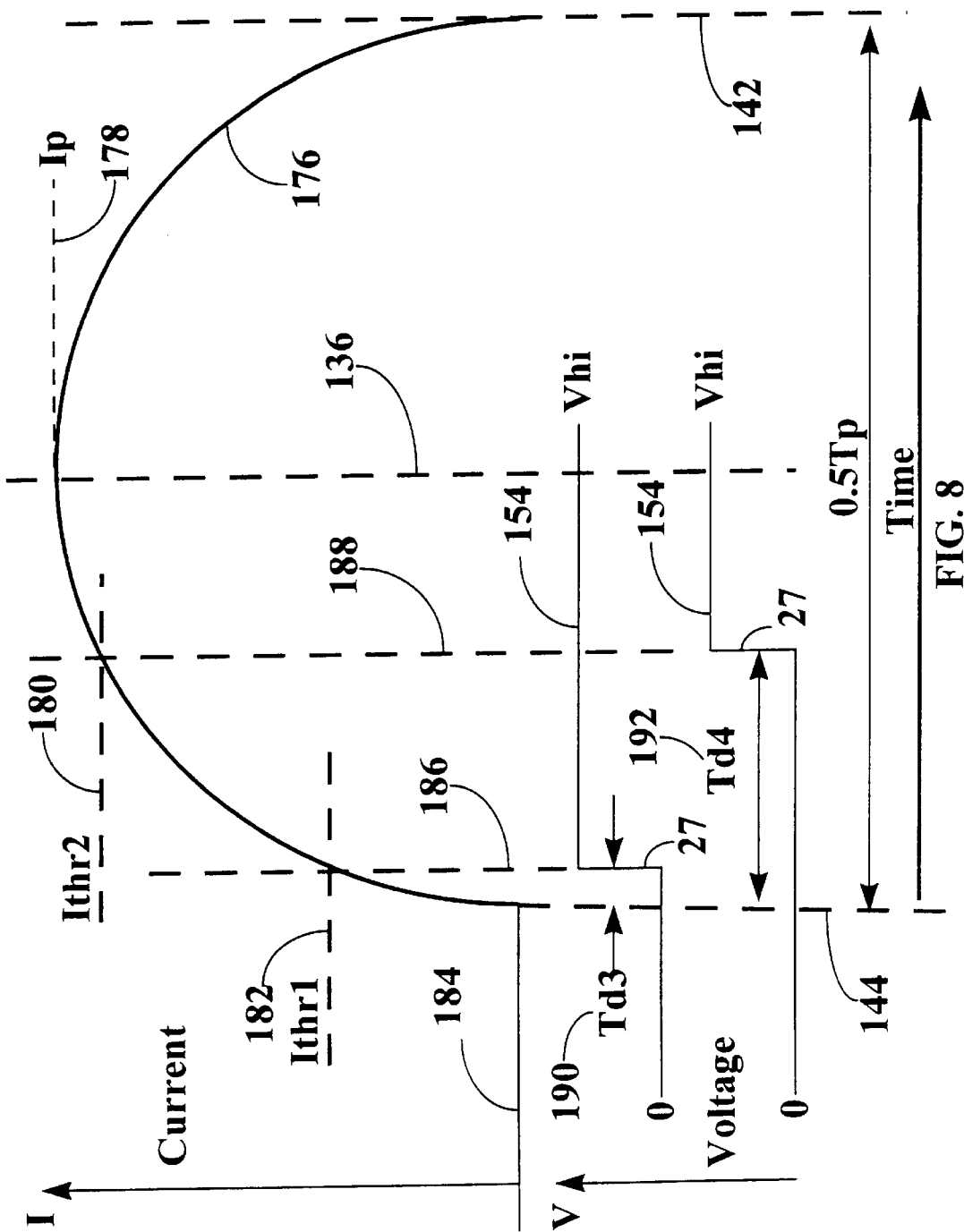
FIG. 8 illustrates a first telephone ring signal current waveform and associated threshold reference currents and timing waveforms relating to FIG. 6 and FIG. 7 for the first half cycle time period of the first telephone ring signal cycle time period.

For cycle time period Tp of voltage Vring, FIG. 8 shows waveform 176 of current Iring for time period 142, in addition to waveform 154 with voltage and timing parameters associated with processor 146 of FIG. 6 and FIG. 7. During time period 136, current Iring initially increases from a pre-ring signal quiescent current 184 at time 144 to exceed a first predetermined threshold reference current 182, or Ithr1, at a first threshold current crossing time 186. Comparator 168 of FIG. 7 provides waveform 154 on line 158 with ring detect signal 27 occurring at time 186. Ring detect signal 27 is delayed from time 144 by a third ring signal detect delay time 190, or Td3. Delay time 190 can be increased, by increasing the threshold reference current to a second predetermined threshold reference current 180, or Ithr2. For this case, current Iring initially increases from current 184 at time 144 to exceed current Ithr2 at a second current threshold crossing time 188. Comparator 168 provides ring detect signal 27 at time 188, which is delayed from time 144 by a fourth ring signal detect delay time 192, or Td4. Since threshold voltage Vth corresponds to threshold reference current Ithr, the ring signal detect output signal delay time can be predetermined by the predetermined threshold reference current Ithr. Thus the ring signal detect output signal delay time can be predetermined without requiring specific circuitry to measure time intervals as previously discussed. If current Ithr is greater than a peak ring signal current 178, or Ip, then voltage Vth is greater than voltage Vp, and the first threshold current crossing would never occur. Thus current Ithr must always be less than current Ip for detecting the ring signal.

Figure 9:
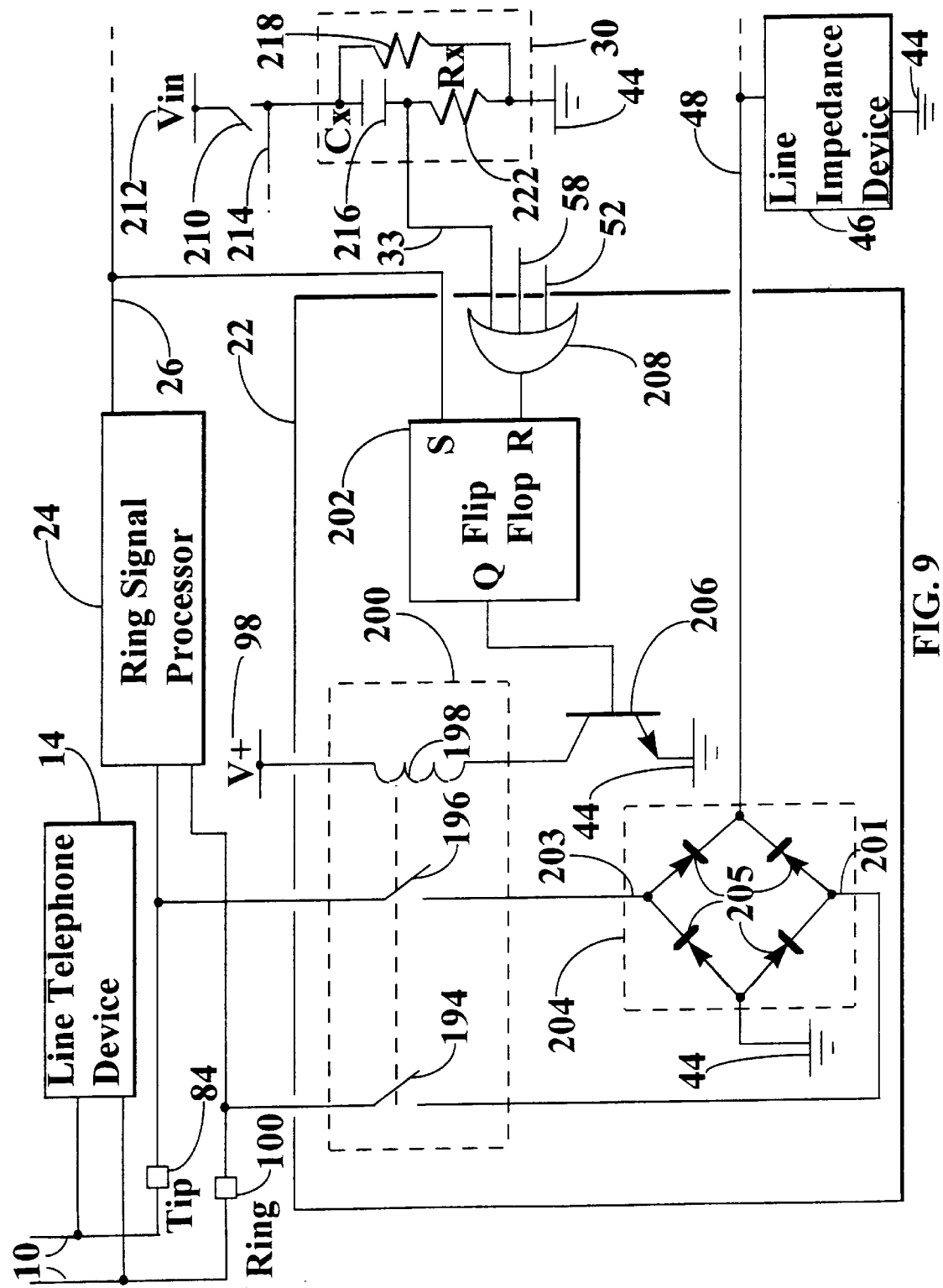
FIG. 9 is a detailed partial block diagram and circuit schematic diagram for one embodiment of a line impedance switch of FIG. 1, in conjunction with adjacent ring signal detector functional blocks and a power-on reset circuit.

FIG. 9 is a detailed partial block diagram and circuit schematic of line impedance switch 22 of FIG. 1, in conjunction with other functional devices associated with detector 16, including power-on reset device 30. Switch 22 comprises a line relay 200, a polarity guard 204, a relay energizing switching transistor 206, a RS type flip-flop 202, and a switch deactivating OR gate 208. Relay 200 further comprises a line coupling relay switch pair 194 and 196 and a relay energizing inductor 198. Switches 196 and 194 are coupled to Tip and Ring input terminals 84 and 100 respectively. Switches 194 and 196 are also coupled to a first and a second guard input lines 201 and 203 respectively which are coupled to guard 204. An output of guard 204 is coupled to line 48 relative to terminal 44. Polarity guard diodes 205 are identical in connection as discussed for guard 92 in FIG. 4. At least device 46 is coupled to line 48. Inductor 198 is coupled to voltage 98 and to a collector of transistor 206 which has an emitter coupled to terminal 44. Ring detect output line 26 is coupled to a Set (S) input of flip-flop 202, and an output of OR gate 208 is coupled to a Reset (R) input of flip-flop 202. A first OR gate input is coupled to line 52, and a second OR gate input is coupled to line 58, and a third OR gate input is coupled to line 33.

Power-on reset circuits for resetting circuit latches during a power supply "turn-on" are well known. An example is shown by reset device 30 in FIG. 9. A power switch 210 is coupled between a primary power supply voltage 212, or Vin, and a telephone ring signal detector supply voltage line 214, which supplies voltage 98 for ring signal detector 16. Line 214 is also coupled to device 30 which is coupled to terminal 44. Device 30 comprises a discharge resistors 218, an integrating resistor 222, and an integrating capacitor 216. Resistor 218 is coupled between terminal 44 and switch 210. Capacitor 216 and resistor 222 are coupled together and to line 33. Capacitor 216 is also coupled to switch 210 and line 214. Resistor 222 is coupled to terminal 44.

Functionally, when switch 210 is in a non-conducting "open" position, resistors 218 and 222 discharge capacitor 216 to zero volts, and voltage 98 on line 214 is also discharged to zero volts. When switch 210 "closes" to a conducting position, Vin is coupled to line 214 to provide voltage 98, causing a positive increasing reset voltage on line 33, since zero volts across capacitor 216 cannot change instantaneously. When the reset voltage is applied to OR gate 208, the reset voltage is coupled to the Reset(R) input of flip-flop 202, which resets a Q output of flip-flop 202 to a low voltage logic state. The low voltage state on the Q output maintains a non-conducting current in transistor 206, resulting in a non-conducting current in inductor 198. Thus switches 194 and 196 are maintained in a "open" non-conducting position prior to voltage Vring. After flip-flop 202 is reset, resistor 222 charges capacitor 216 which causes a decreasing reset voltage on line 33 having a reset voltage decay time constant Tr, where Tr=(Rx)(Cx). After switch 210 is in a conducting "closed" position for a "turn-on" time much greater than time Tr, reset voltage on line 33 decreases to zero volts, which is reflected through the OR gate to provide a low voltage logic state on the Reset(R) input of flip-flop 202. This enables flip-flop 202 to respond to any future logic signals on the Set input.

The remaining function of FIG. 9 is next described. When voltage Vring is applied to line 10 by the CO, processor 24 provides ring detect signal 27 on line 26 during time period 136 of the first ring signal cycle time period Tp as previously discussed. The positive voltage transition of ring detect signal 27 is applied to the Set(S) input of flip-flop 202, causing a high voltage logic state on the Q output to bias transistor 206 into a current conducting state. The resulting current flow through inductor 198 activates switches 194 and 196 into a conducting "closed" position. This couples input lines 203 and 201 of guard 204 to line 10 through terminals 84 and 100 respectively. Since the output of guard 204 is coupled to line 48, the first off-hook terminal impedance of device 46 is also coupled to line 10 in response to ring detect signal 27. As previously described, the CO senses the first off-hook terminal impedance on line 10 and terminates voltage Vring to prevent the "ringing" of line telephone devices connectable to line 10 such as device 14. When either the first output line monitor output signal on line 58, or the input line monitor output signal on line 52 occurs, the low to higher voltage transition of these signals is coupled through OR gate 208 to the Reset(R) input of flip-flop 202. This resets the Q output of flip-flop 202 to a low voltage logic state which uncouples switches 194 and 196 as previously discussed, thereby uncoupling at least device 46 from line 10.

Circuit components associated with impedance switch 22 are well known. For example, relay 200 could be a Potter and Brumfield T81H5D312-05 telecommunications relay. Diodes 205 in guard 204 could be industry standard 1N4004 devices. Transistor 206 could be a 2N2222. Flip-flop 202 could be one of four flip-flops in a Motorola MC14043B Quad RS Latch IC. The OR gate 208 could be one of two OR gates in a Motorola MC14072B Dual 4-input OR gate IC with one input connected to a high voltage logic state.

All remaining block functions associated with FIG. 1 are well known to one with ordinary skills in the art. For example, switch 28 is similar to switch 22, except the Set input of flip flop 202 can be connected to line 58 and OR gate 208 can employ one input for power-on reset line 33, and one other input coupled to line 34. The remaining OR gate inputs are coupled to a high voltage logic state. Switches 194 and 196 can be coupled directly to port 40, eliminating guard 204 and line 48. Line impedance device 46 can be a resistor which is of a sufficiently low resistive value to simulate the first off-hook terminal impedance. Device 46 can also be a telephone line interface circuit such as a Motorola MC34014 Telephone Speech Network With Dialer Interface IC which provides the first off-hook terminal impedance and a line interface function which allows generator 54, decoder 56 and monitor 50 to be coupled to line 45 through the MC34014 IC. Line signal decoder 56 can be a Harris CD22204 5V Low Power Subscriber DTMF Receiver IC. Audible alerting device 60 could be a Motorola MC34012-1 Telephone Tone Ringer IC, which is coupled to a Piezo sound element such as Motorola models KSN 1113-1118. Ring signal generator 32 can be that described by U.S. Pat. No. 4,611,097 issued to Grimes, Sep. 9, 1986, entitled, A sine wave generator. Other applicable patents for ring signal generator 32 include 4220826, 4349703, 4866587, 4611097, and 4500844. Monitor 36, which monitors the off-hook and on-hook terminal impedance of device 42 at port 40, can use techniques described by U.S. Pat. No. 4,406,929 issued to Pace, Sep. 27, 1983, entitled, Hook status detector for a subscriber loop interface circuit. Other applicable patents to detect off-hook and on-hook terminal impedance of device 42 at port 40 are U.S. Pat. Nos. 4,423,292, 5,347,575, 5,402,482, 5,335,271, and 4,995,111. Several known methods can be used for input line monitor 50 to monitor the first and the second off-hook terminal impedances coupled to line 10. One method monitors line current variations due to variations in off-hook terminal impedance on line 10 as described by U.S. Pat. No. 5,488,654 issued to Oliver, Jan. 30, 1996, entitled, Telemetry device including a dynamic off-hook detector capable of operating in a pulse-dialing environment. Another applicable patent is U.S. Pat. No. 5,521,974 issued to Hayashi, May 28, 1996, entitled, Line in-use indicator for a telephone set and facsimile machine connected to a single telephone line. Other known detectors of off-hook terminal impedances include U.S. Pat. Nos. 4,811,389, 5,291,545, 4,802,207, and 5,446,786. The audio "ringback" signal associated with generator 54 can be generated with a tone frequency generator such as a National TP5089 DTMF (Touch Tone) Generator IC to generate non-standard DTMF pairs of signal frequencies in combination with a Motorola MC1455 Timing Circuit IC to generate the predetermined cadence for the audio "ringback" signal. The audio voice signal provided by generator 54 can use well known techniques employed by digital telephone answering devices (DTAD). Such techniques are shown by U.S. Pat. No. 4,616,110 issued to Hashimoto, Oct. 7, 1986, Automatic digital telephone answering apparatus. Other known audio signal methods are described in U.S. Pat. Nos. 5,251,261, 5,400,393, 558,804, 5,483,577, and 4,518,827. Commercially, any Texas Instruments TSPC0x/1x family of devices can provide the voice signal by generator 54.

It should be apparent from the foregoing discussion that a novel telephone ring signal detector has been provided to detect a telephone ring signal voltage on a telecommunications line and, in a first and second aspect of the invention, to provide a first telephone answering function by coupling a first telephone device off-hook terminal impedance to the line in response to a ring signal detect output signal which occurs prior to a quarter cycle time period of a telephone ring signal cycle time period. This answering function prevents the telephone ring signal voltage from gaining sufficient magnitude or energy to activate any telephone ringer mechanisms associated with line telephone devices connectable to the line. Furthermore, this function has been achieved without the need, complexity or cost of a time measurement circuit to measure any time intervals.

In a third aspect of the invention and in response to the ring detect signal, the detector provides a detector line signal coupled to the line as a voice or "ringback" signal or both, and the detector further provides a simulated telephone ring signal at a telephone device output port which is connectable to an output telephone answering device. When the output device provides a second telephone answering function by providing an output telephone device off-hook terminal impedance to the output port, an output line monitor uncouples the first off-hook terminal impedance from the line, terminates the simulated ring signal, terminates the detector line signal, and couples the output port to the line. When the output device provides an output telephone device on-hook terminal impedance, the output line monitor uncouples the output port from the line. The coupling and uncoupling of the output port and associated output device from the line is strictly a function of the output answering device characteristics. Thus such functions as the detection of caller "hang-up" or inactivity on the line are not required by the detector thereby reducing the cost and complexity of the detector.

In a forth aspect of the invention, the detector further includes a line signal decoder coupled to decode a caller line signal having a caller line signal frequency. When the signal frequency is at least one predetermined caller line signal frequency, a line signal decoder output signal activates an audible alerting device which produces an audible alerting signal. In response to the alerting signal, a person could activate the line telephone device which provides a second telephone device off-hook terminal impedance on the line. An input line monitor detects the first and the second off-hook terminal impedances coupled to the line and provides a input line monitor output signal which terminates the simulated telephone ring signal and uncouples the first off-hook terminal impedance from the line.

While the invention has been described in the context of preferred embodiments, it will be apparent to those skilled in the art that the present invention may be modified in numerous ways and may assume many embodiments other than those specifically set out and described above. Accordingly it is intended by the appended claims to cover all modifications of the invention which fall within the true spirit and scope of the invention.

I claim:

1. A telephone ring signal detector for detecting a telephone ring signal voltage on a telecommunications line comprising:

a voltage translating means for translating said telephone ring signal voltage to a translated electrical parameter;

an electrical parameter threshold setting means for providing a ring signal detect output signal when an electrical parameter value of said translated electrical parameter exceeds a predetermined threshold reference electrical parameter value;

a line impedance means for providing a first telephone device off-hook terminal impedance; and a line impedance switch means for coupling said line impedance means to said telecommunications line when said ring signal detect output signal occurs, whereby said ring signal detect output signal occurring prior to a first quarter cycle time period of a first telephone ring signal cycle time period, and said ring signal detect output signal being an only output signal responding to said telephone ring signal voltage for activating said line impedance switch means.

2. A telephone ring signal detector according to claim 1 wherein:

said translated electrical parameter being a translated telephone ring signal voltage; and said electrical parameter threshold setting means being a voltage threshold setting means; and said electrical parameter value being a voltage; and said predetermined threshold reference electrical parameter value being a predetermined threshold reference voltage.

3. A telephone ring signal detector according to claim 2 wherein said voltage threshold setting means further comprises:

a threshold reference voltage means for establishing said predetermined threshold reference voltage; and a voltage comparator means for providing said ring signal detect output signal when said translated telephone ring signal voltage exceeds said predetermined threshold reference voltage.

4. A telephone ring signal detector according to claim 1 wherein:

said translated electrical parameter being a translated telephone ring signal current; and said electrical parameter threshold setting means being a current threshold setting means; and said electrical parameter value being a current; and said predetermined threshold reference electrical parameter value being a predetermined threshold reference current.

5. The telephone ring signal detector according to claim 4 wherein said current threshold setting means further comprises:

a threshold reference current means for establishing said predetermined threshold reference current; and a current comparator means for providing said ring signal detect output signal when said translated telephone ring signal current exceeds said predetermined threshold reference current.

6. A telephone ring signal detector according to claim 1 further comprises:

a telephone device output port means connectable to an output telephone device terminal impedance; and a telephone ring signal generator means for providing a simulated telephone ring signal in response to said ring signal detect output signal, said simulated telephone ring signal being coupled to said telephone device output port means; and a port coupling line switch means for selectively coupling said telephone device output port means to said telecommunications line; and an output line monitor means for uncoupling said first telephone device off-hook terminal impedance of said line impedance means from said telecommunications line, for terminating said simulated telephone ring signal, and for activating said port coupling line switch means which couples said telephone device output port means to said telecommunications line when said output telephone device terminal impedance being an output telephone device off-hook terminal impedance, said output line monitor means for uncoupling said port coupling line switch means which uncouples said telephone device output port means from said telecommunications line when said output telephone device terminal impedance being an output telephone device on-hook terminal impedance.

7. A telephone ring signal detector according to claim 6 further comprises a line signal generator for providing a detector line signal coupled to said telecommunications line in response to said ring signal detect output signal, said detector line signal having at least one detector line signal frequency.

8. A telephone ring signal detector according to claim 1 further comprises:
- a line input port means coupled to said telecommunications line which is connectable to at least a second telephone device off-hook terminal impedance, said telecommunications line capable of having a caller line signal, said caller line signal having a caller line signal frequency; and
- a line signal decoder means for decoding said caller line signal frequency, and providing a line signal decoder output signal if said caller line signal frequency is at least one predetermined caller line signal frequency; and
- an audible alerting means responsive to said line signal decoder output signal, providing an audible alerting signal; and
- an input line monitor means for uncoupling said first telephone device off-hook terminal impedance of said line impedance means from said telecommunications line when said first telephone device off-hook terminal impedance being coupled to said second telephone device off-hook terminal impedance.

9. A telephone ring signal detector according to claim 8 further comprises a line signal generator for providing a detector line signal coupled to said telecommunications line in response to said ring signal detect output signal, said detector line signal having at least one detector line signal frequency.

10. A telephone ring signal detector for detecting a telephone ring signal voltage on a telecommunications line comprising:
- a voltage translating means having a voltage translating means input coupled to said telecommunications line for translating said telephone ring signal voltage to a translated electrical parameter, and having a voltage translating means output for providing said translated electrical parameter;
- an electrical parameter threshold setting means having an electrical parameter threshold setting means input coupled to said voltage translating means output, and having an electrical parameter threshold setting means output for providing a ring signal detect output signal when an electrical parameter value of said translated electrical parameter exceeds a predetermined threshold reference electrical parameter value;
- a line impedance means having a line impedance means output for providing a first telephone device off-hook terminal impedance; and
- a line impedance switch means coupled to said electrical parameter threshold setting means output for receiving said ring signal detect output signal, and coupled to said telecommunications line and to said line impedance means output for coupling said line impedance means to said telecommunications line when said ring signal detect output signal occurs, whereby said ring signal detect output signal occurring prior to a first quarter cycle time period of a first telephone ring signal cycle time period, and said ring signal detect output signal being an only output signal responding to said telephone ring signal voltage for activating said line impedance switch means.

11. A telephone ring signal detector of claim 10 wherein:
- said translated electrical parameter being a translated telephone ring signal voltage; and
- said electrical parameter threshold setting means being a voltage threshold setting means; and
- said electrical parameter value being a voltage; and
- said predetermined threshold reference electrical parameter value being a predetermined threshold reference voltage.

12. A telephone ring signal detector of claim 11 wherein said voltage threshold setting means further comprises:
- a threshold reference voltage means for establishing said predetermined threshold reference voltage, having a threshold reference voltage means output for providing said predetermined threshold reference voltage; and
- a voltage comparator means having a first voltage comparator means input coupled to said threshold reference voltage means output, and having a second voltage comparator means input coupled to said voltage translating means output, and having a voltage comparator means output for providing said ring signal detect output signal when said translated telephone ring signal voltage exceeds said predetermined threshold reference voltage.

13. A telephone ring signal detector of claim 10 wherein:
- said translated electrical parameter being a translated telephone ring signal current; and
- said electrical parameter threshold setting means being a current threshold setting means; and
- said electrical parameter value being a current; and
- said predetermined threshold reference electrical parameter value being a predetermined threshold reference current.

14. A telephone ring signal detector of claim 13 wherein said current threshold setting means further comprises:
- a threshold reference current means for establishing said predetermined threshold reference current and having a threshold reference current means output for providing said predetermined threshold reference current; and
- a current comparator means having a first current comparator means input coupled to said threshold reference current means output, and having a second current comparator means input coupled to said voltage translating means output and having a current comparator means output for providing said ring signal detect output signal when said translated telephone ring signal current exceeds said predetermined threshold reference current.

15. A telephone ring signal detector according to claim 10 further comprises:
- a telephone device output port means connectable to an output telephone device terminal impedance; and a telephone ring signal generator means coupled to said telephone device output port means for providing a simulated telephone ring signal to said telephone device output port means in response to said ring signal detect output signal; and a port coupling line switch means coupled between said telecommunications line and said telephone device output port means for selectively coupling said telephone device output port means to said telecommunications line; and an output line monitor means coupled to said telephone ring signal generator and to said telephone device output port means for providing an output line monitor means output signal which is coupled to at least one output line monitor means output, said output line monitor means output signal being a first output line monitor means output signal when said output telephone device terminal impedance being an output telephone device off-hook terminal impedance, said output line monitor means output signal being a second output line monitor means output signal when said output telephone device terminal impedance being an output telephone device on-hook terminal impedance, said output line monitor means output coupled to said line impedance switch means for uncoupling said first telephone device off-hook terminal impedance of said line impedance means from said telecommunications line in response to said first output line monitor means output signal, said output line monitor means output further coupled to said telephone ring signal generator for terminating said simulated telephone ring signal in response to said first output line monitor means output signal, said output line monitor means output also coupled to said port coupling line switch means for activating said port coupling line switch means to couple said telephone device output port means to said telecommunications line in response to said first output line monitor means output signal, said output line monitor means output being further coupled to said port coupling line switch means for uncoupling said port coupling line switch means to uncouple said telephone device output port means from said telecommunications line in response to said second output line monitor means output signal.

16. A telephone ring signal detector according to claim 15 further comprises a line signal generator, having a line signal generator output coupled to said telecommunications line for providing a detector line signal in response to said ring signal detect output signal, said detector line signal, having at least one detector line signal frequency, and said line signal generator, having a line signal generator input to receive said ring signal detect output signal.

17. A telephone ring signal detector according to claim 10 further comprises:

a line input port means coupled to said telecommunications line which is connectable to at least a second telephone device off-hook terminal impedance, said telecommunications line capable of having a caller line signal, said caller line signal having a caller line signal frequency; and a line signal decoder means being coupled to said telecommunications line for decoding said caller line signal frequency, and providing a line signal decoder means output signal provided at a line signal decoder means output when said caller line signal frequency is at least one predetermined caller line signal frequency; and an audible alerting means coupled to said line signal decoder means output for responding to said line signal decoder output signal, to provide an audible alerting signal; and an input line monitor means being coupled to said telecommunications line, having an input line monitor means output coupled to said line impedance switch means for providing a input line monitor means output signal for uncoupling said first telephone device off-hook terminal impedance of said line impedance means from said telecommunications line, said input line monitor means output signal in response to said first telephone device off-hook terminal impedance of said line impedance means being coupled to said second telephone device off-hook terminal impedance.

18. A telephone ring signal detector according to claim 17 further comprises a line signal generator coupled to said telecommunications line, having a line signal generator means output for providing a detector line signal in response to said ring signal detect output signal, said detector line signal having at least one detector line signal frequency, and said line signal generator having a line signal generator input to receive said ring signal detect output signal.

19. A method of detecting a telephone ring signal voltage on a telecommunications line comprising the steps of:

coupling said telephone ring signal voltage to a telephone ring signal detector;

comparing said telephone ring signal voltage to a to a predetermined ring signal threshold voltage;

outputting a ring signal detect output signal when said telephone ring signal voltage exceeds said predetermined ring signal threshold voltage;

providing a first telephone device off-hook terminal impedance; and coupling said first telephone device off-hook terminal impedance to said telecommunications line when said ring signal detect output signal occurs, whereby said ring signal detect output signal occurring prior to a first quarter cycle time period of a first telephone ring signal cycle time period, and said ring signal detect output signal being an only output signal responding to said telephone ring signal voltage for coupling said first telephone device off-hook terminal impedance to said telecommunications line.

20. A method of detecting a telephone ring signal voltage according to claim 19 further comprises the steps of:

providing a telephone device output port means connectable to an output telephone device terminal impedance; and generating a simulated telephone ring signal in response to said ring signal detect output signal; and coupling said simulated telephone ring signal to said telephone device output port means; and providing a first output line monitor means output signal when said output telephone device terminal impedance being an output telephone device off-hook terminal impedance; and terminating said simulated telephone ring signal in response to said first output line monitor means output signal; and coupling said telephone device output port means to said telecommunications line in response to said first output line monitor means output signal; and uncoupling said first telephone device off-hook terminal impedance from said telecommunications line in response to said first output line monitor means output signal; and providing a second output line monitor means output signal when said output telephone device terminal impedance being an output telephone device on-hook terminal impedance; and uncoupling said telephone device output port means from said telecommunications line in response to said second output line monitor means output signal.

21. A method of detecting a telephone ring signal voltage according to claim 20 further comprises the steps of:

generating a detector line signal having at least one detector line signal frequency in response to said ring signal detect output signal; and coupling said detector line signal to said telecommunications line.

22. A method of detecting a telephone ring signal voltage according to claim 19 further comprises the steps of:

providing a line input port means coupled to said telecommunications line connectable to at least a second telephone device off-hook terminal impedance, said telecommunications line being capable of having a caller line signal frequency; and decoding said caller line signal frequency on said telecommunications line; and providing a line signal decode output signal when said caller line signal frequency is at least one predetermined caller line signal frequency; and generating an audible alerting signal in response to said line signal decode output signal; and uncoupling said first telephone device off-hook terminal impedance of said line impedance means from said telecommunications line when said first telephone device off-hook terminal impedance of said line impedance means being coupled to said second telephone device off-hook terminal impedance.

23. A method of detecting a telephone ring signal voltage according to claim 22 further comprises the steps of:

generating a detector line signal having at least one detector line signal frequency in response to said ring signal detect output signal; and coupling said detector line signal to said telecommunications line.

* * * * *